United States Patent
Aklil

(10) Patent No.: US 8,749,517 B2
(45) Date of Patent: Jun. 10, 2014

(54) TOUCH-SENSING DEVICE WITH A TOUCH HOLD FUNCTION AND A CORRESPONDING METHOD

(75) Inventor: Djamel Aklil, Marseilles (FR)

(73) Assignee: Elo Touch Solutions, Inc., Menlo Park, CA (US)

( * ) Notice: Subject to any disclaimer, the term of this patent is extended or adjusted under 35 U.S.C. 154(b) by 201 days.

(21) Appl. No.: 13/146,191

(22) PCT Filed: Jan. 22, 2010
(Under 37 CFR 1.47)

(86) PCT No.: PCT/EP2010/000395
§ 371 (c)(1),
(2), (4) Date: Mar. 19, 2012

(87) PCT Pub. No.: WO2010/086125
PCT Pub. Date: Aug. 5, 2010

(65) Prior Publication Data
US 2013/0057502 A1    Mar. 7, 2013

(30) Foreign Application Priority Data
Jan. 29, 2009  (EP) .................................... 09290065

(51) Int. Cl.
*G06F 3/045* (2006.01)
*G06F 3/043* (2006.01)

(52) U.S. Cl.
USPC ..................... 345/174; 178/18.04; 178/18.06; 345/177

(58) Field of Classification Search
USPC .......... 345/156–184; 178/18.01–18.09, 18.11
See application file for complete search history.

(56) References Cited

U.S. PATENT DOCUMENTS

| | | | |
|---|---|---|---|
| 3,916,099 A | 10/1975 | Hlady | |
| 6,501,463 B1* | 12/2002 | Dahley et al. | 345/173 |
| 7,190,350 B2 | 3/2007 | Roberts | |
| 7,746,325 B2 | 6/2010 | Roberts | |
| 2002/0093491 A1* | 7/2002 | Gillespie et al. | 345/173 |

(Continued)

FOREIGN PATENT DOCUMENTS

| | | |
|---|---|---|
| WO | WO 02/35460 A | 5/2002 |
| WO | WO 2006/108443 A1 | 10/2006 |
| WO | WO 2006/133018 A | 12/2006 |

OTHER PUBLICATIONS

Communication from European Patent Office from European Patent Application No. 09290065.3, dated Jul. 29, 2011.

(Continued)

*Primary Examiner* — Stephen Sherman
(74) *Attorney, Agent, or Firm* — Alston & Bird LLP

(57) ABSTRACT

The invention relates to a touch-sensing device comprising an interaction surface with a touch location system for determining a touch position based on an acoustic signal. Gaskets, forming a means for acoustically isolating the interaction surface from the underground on which it is placed, are provided with an upper electrode and a lower electrode. The gaskets are elastically compressible and have dielectric properties, so that the two electrodes and the gasket form a capacitor with a capacitance that varies with the force applied to the interaction surface. In addition to the touch position determined by the acoustic signal, the touch-sensing device detects a touch duration based on capacitance variations, so that touch events can be classified according to their duration. The invention also relates to the corresponding method.

11 Claims, 5 Drawing Sheets

(56) References Cited

U.S. PATENT DOCUMENTS

Figure 1A:
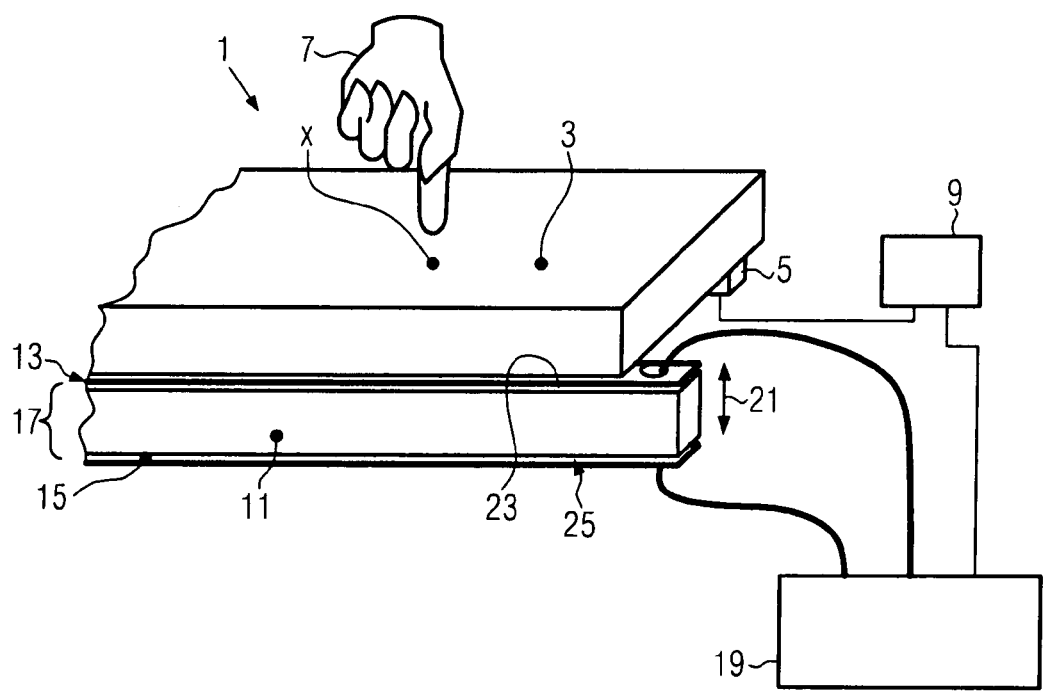

2003/0063073 A1* 4/2003 Geaghan et al. ............. 345/173
2006/0197753 A1* 9/2006 Hotelling ..................... 345/173
2006/0279548 A1* 12/2006 Geaghan ...................... 345/173
2007/0205995 A1* 9/2007 Woolley ....................... 345/173
2008/0291177 A1* 11/2008 Kuo et al. .................... 345/175
2009/0122028 A1   5/2009 Ing
2010/0156813 A1* 6/2010 Duarte et al. ................ 345/173

OTHER PUBLICATIONS

European Search Report dated Jun. 22, 2009 in EP 09 29 0065 (counterpart of the above-identified application).
International Search Report dated Feb. 23, 2010 in PCT/EP2010/000395.
Chinese Office Action for Application No. 201080005986.1, dated Jul. 12, 2013.

* cited by examiner

TOUCH-SENSING DEVICE WITH A TOUCH HOLD FUNCTION AND A CORRESPONDING METHOD

This invention relates to a touch-sensing device with a touch hold function and a method for determining whether a touch is followed by a hold or a release action.

Known touch-sensing devices are based on various technologies. Examples are capacitive, resistive, pressure sensitive and acoustic systems. Such devices, serving as user-machine interface, find application in numerous products, like touch screens in kiosks, vending machines, on personal electronics and in combination with computers and are in particular advantageous in an environment in which keyboards would accumulate dust or dirt.

One special category of the touch-sensing devices is formed by devices based on the analysis of acoustic signals corresponding to acoustic flexion waves induced by an impact on an interaction means, like the Reversys™ method described in WO 2006/108443. In this technology, the acoustic wave signals resulting from a touch on an interaction means are detected by transforming means for transforming an excitation of the interaction means into respective signals and a signal processing means determines the position of excitation on the interaction means based on the sensed signals. The location of the excitation can for example be determined using the difference in timing and/or the amplitude of the acoustic signals. The system based on the analysis of acoustic waves has the advantage that the interaction means can be made out of any material which can transmit acoustic waves. Excitations can be effected by a finger, but also a gloved hand or a stylus may be used. Such a touch control system provides position detection with a high accuracy and can also detect multi-touch excitation and drag movements.

With the fading away of the acoustic signal, after an impact on the interaction means occurred, the acoustic method, is limited with respect to the detection of prolonged touch hold actions, when a user touches the interaction means and the finger remains on the interaction means, or the detection of touch release.

It is therefore a first object of the present invention to provide a touch sensitive device with a touch location system for determining a touch position based on acoustic signal with the possibility to implement a touch hold function, discriminating between a touch-release action and a touch-hold action. The object of the invention is achieved with the touch sensitive device according to claim 1 and the method according to claim 12.

The touch sensing device according to claim 1, which comprises an interaction surface, in particular a touch panel, with a touch location system for determining a touch position based on an acoustic signal, an acoustic isolating means being elastically compressive and dielectric provided on one surface of the interaction surface, a first conductive electrode provided between the interaction surface and the isolating means, a second conductive electrode, the first conductive electrode and the second conductive electrode sandwiching the isolating means, and a means for determining the capacitance between the first conductive electrode and the second conductive electrode.

According to the invention, advantage is taken of the presence of an acoustic isolator necessary to acoustically decouple the interaction means from the rest of the touch sensitive device, to provide an additional sensor. Indeed, by providing electrodes on the upper and lower surface of the acoustic isolator, a capacitive sensor is integrated into the device. This sensor is sensitive to forces applied to the surface of the interaction surface. Forces on the interaction surface cause a compression of the gasket, so that the distance between the electrodes is reduced, causing an increase in capacitance. By monitoring the capacitance, a continuous record of external forces exerted on the interaction surface can thus be obtained. By comparing the capacitance variations with the touch events detected by the acoustic system, the duration of a touch event can be determined, even after the acoustic signal has already lapsed. Consequently, a touch hold action, thus a situation when a user touches the interaction means at one location for a longer time, can still be detected. Thus touch events at a given position can be classified into a short touch event, like a tap or a knock, or into a touch-hold event, for instance exceeding a certain predetermined duration. By monitoring the capacitance, it will also become possible to determine the moment at which the user leaves the interaction means (touch release event).

The same advantageous effects are achieved with the method according to claim 12.

Further advantageous modifications of the touch-sensing device according to the invention are set out in the dependent claims.

Figure 1B:
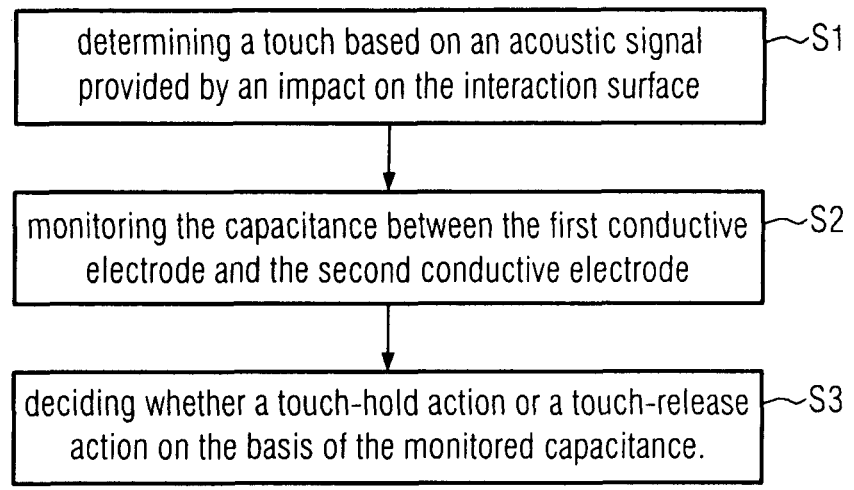
Figure 1C:
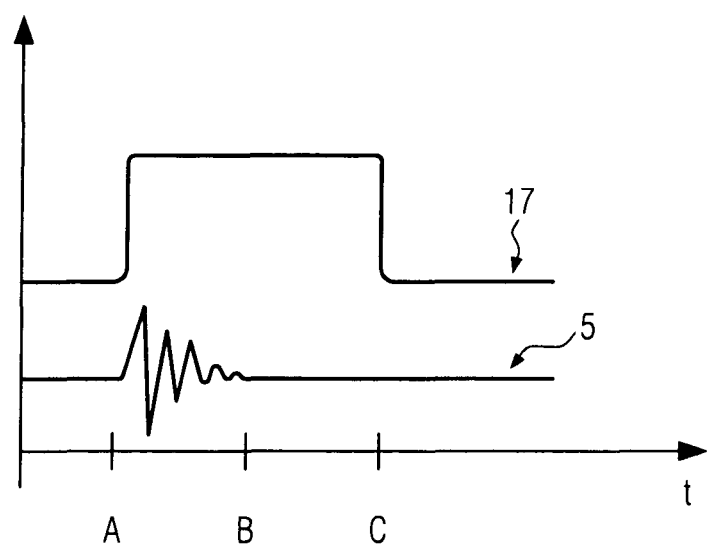
Figure 2A:
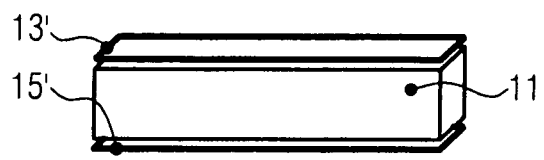
Figure 2B:
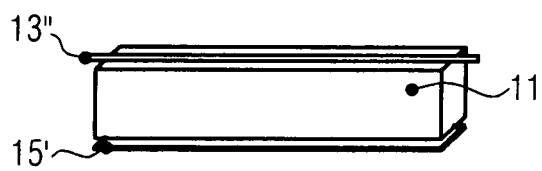
Figure 2C:
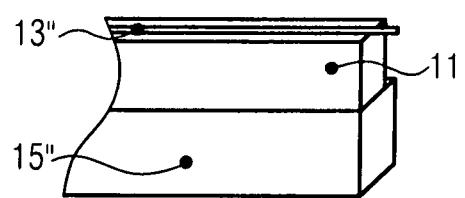
Figure 3:
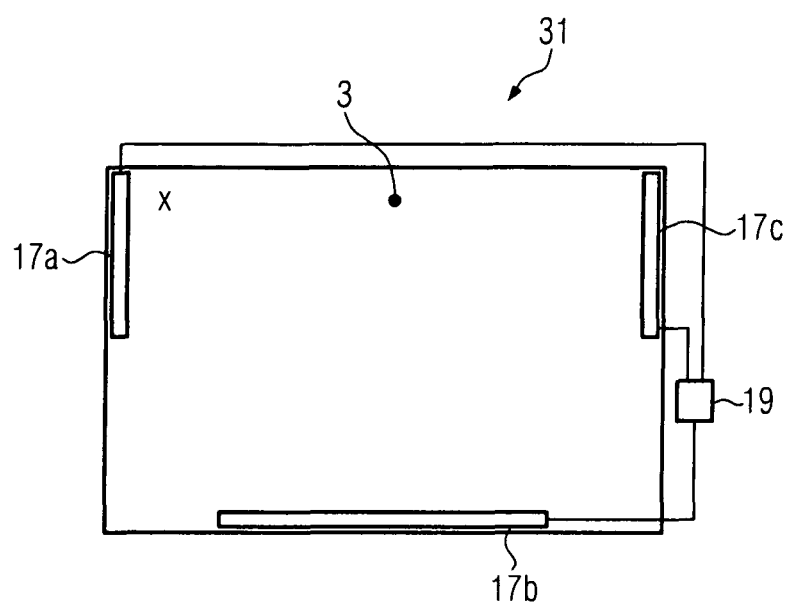

Specific embodiments of the present invention will become more apparent from the present description with reference to the accompanying drawings, wherein FIG. 1a illustrates a first example of an embodiment of the present invention, showing a touch panel as an example of an interaction surface of the present invention, and an acoustically isolating gasket as an example of the isolating means, the isolating gasket being sandwiched between two strips of adhesive copper tape as an example of the conductive electrodes of the present invention, FIG. 1b illustrates an inventive method using the first embodiment as illustrated in FIG. 1a, FIG. 1c schematically illustrates the signals captured by an acoustic transducer and a capacitor of the first embodiment, FIGS. 2a to 2c illustrate further variants of the first embodiment according to the present invention relating to different electrodes, and FIG. 3 illustrates a second embodiment of the invention with an interaction surface provided with three capacitive sensors according to the present invention.

The touch-sensitive device, illustrated in FIG. 1a according to a first embodiment of the invention comprises an interaction surface 3, here touch panel, e.g. a glass panel, with acoustic transducers 5 attached to the side opposite to where impacts can be applied by a user 7. Such a touch sensitive device can be used together with a display to form a touch screen, but also as a control panel of a machine, like a vending machine, not necessarily needing a display. Typically two or more, preferably three or more, transducers 5 are provided. The transducers are connected to a signal processing means 9. The signal processing means is configured to determine the presence of a touch and eventually its location based on the sensed signals of the transducers 5. The touch panel 3 can be a transparent or semi-transparent panel if used together with an underlying display, but depending on the application could also be an opaque panel.

On one surface, typically the one opposite where impacts occur, of the touch panel 3, a gasket 11 is provided as an acoustic isolation means to isolate the touch panel 3 acoustically from the rest of the device (not shown) to which it is attached. The gasket 11 is formed of an elastically compressible, dielectric material.

In the present invention, two electrodes 13 and 15 of a conductive material are provided, sandwiching the gasket 11. The first electrode 13 is arranged between the touch panel 3 and the gasket 11, and the second electrode 15 is placed at the opposite side of the gasket 11, thus opposing the side of the gasket 11 contacting the first electrode 13. The two electrodes 13 and 15 together with the gasket 11 form a capacitor 17 with a certain capacitance. That capacitance is measured with a means for determining the capacitance 19, which is also configured to monitor capacitance changes thus acting as capacitance processing means. The means for determining the capacitance 19 could be incorporated into the processing means 9, for example in the form of a computer processor.

In an operational situation, the touch panel 3 is placed in contact with an external surface, e.g. a display of a monitor. Depending on the inclination of the surface, a certain force is exerted on the elastically compressible material and a corresponding capacitance can be measured by means 19. A change in capacitance will be detected if the distance between the two electrodes 13 and 15 changes, for example because a certain force in applied to the surface of the touch panel 3.

The inventive touch sensitive device according to the invention functions the following way. A user 7 touches the interaction means, thus the touch panel 3 at a given position x. The touch creates an acoustic signal captured by transducers 5 which forward the sensed signals to the processing means 9 which analyzes the signals and determines that a touch occurred and eventually provides a precise localisation of the impact (thus position x, in the reference system of the processing means 9) according to step S1 illustrated in FIG. 1*b*. If the user continues to touch the panel, no more acoustic signals will be present, however, the touch implies a certain pressure on the gasket 11 and as a consequence a change in its thickness 21. This changes the dielectric constant of the capacitor 17 which will be detected by the means for determining the capacitance 19 according to step S2. Based on the determined capacitance, as a function of time but also magnitude, it becomes possible to decide according to step 1*c* whether the user still touches the panel 3, thus corresponding to a hold action, or has already removed his finger (release action).

In order to determine the actual moment of the termination of the touch event, various criteria can be used. FIG. 1*c*, illustrates schematically the acoustic signal sensed by the transducer 5 (lower signal) and the capacitance value (upper signal) sensed by the capacitor 17 as a function of time.

At moment A, a user touches the touch panel 3 and the transducer 5 starts sensing a signal, due to the pressure on the touch panel 3, the acoustic isolator changes its thickness and a rise in capacitance can be observed. Whereas at moment B, the acoustic signal has faded away, the capacitor 17 still has a higher capacitance which can be attributed to an hold action of the user, meaning that he still has his finger positioned at location x on the panel. The capacitance processing means 19 can thus decide that a hold action occurs. The capacitance processing means can further decide that at moment C the touch hold action is finished and that the user has released his finger. In fact at moment C, the capacitance values returns to its initial value indicating that the touch panel is no longer under pressure.

Preferably, to trigger a touch action, the change in capacitance shall exceed a predetermined threshold. The threshold value can for example be based on the known properties, like thickness, compressibility and dielectric constant of the isolation means 11. In addition, the capacitance of the two conductive electrodes 13, 15 in relaxed state, i.e. when no touch event is taking place, can also be taken into account.

According to a variant, one can relate the end of the touch event (C) to a change in the capacitance that is larger than a value based on the magnitude of the increase (A) detected at the beginning of the touch event. Eventually, one could also take into account the variation of the capacitance during the period A to C.

According to another variant of the first embodiment, the capacitance processing means 19 can be configured such that a auto adaption process is carried out to take into account the aging of the acoustic means slowly changing its properties over time and thereby the baseline of the measured capacitance, thus the value without a touch on the touch panel 3. Such an auto adaptation routine can be carried out on a regular basis. The capacitance processing means may then take into account the change of the baseline to re-determine the threshold value starting from which one decides that an hold action exists. Furthermore this auto adaption routine can also take into account changing situations, like changing the plane of the touch panel form horizontal to vertical which changes the gravitational forces on the acoustic means and therefore also its baseline capacitance value. Another capability the capacitance measurement provides is the so called palm rejection capability.

Furthermore, a change in the baseline of the capacitance value over a long time without acoustic signal can occur when e.g. a hand lies on the touch panel. In this situation an additional hold action might not be detected, as due to the presence of the hand the threshold for detecting hold action is already passed.

By continuously adapting the baseline to the environment, thus taking into account aging, a new orientation of the panel and/or the presence of a perturbation, the precision of the detection of hold actions after the acoustic signal has faded away can be improved.

For many applications one wants to discriminate between a touch-and-release input action, during which the user hits the touch panel 3 and removes his finger again, and a touch-and-hold action, during which the finger of the user remains on the touch panel 3 for a longer time. Depending on the intended application of the touch-sensing device, a different time threshold might be selected to discriminate between the short touch and release action and the longer touch and hold action. Thresholds can for example be chosen between 0.01 s and 50 s, more preferably between 0.05 s and 10 s, even more preferably between 0.1 s and 1 s.

The capacitance processing means 19 can, according to an advantageous variant, in addition be configured such that if at a time equal to the threshold time no touch release is detected on the basis of the variation in the capacitance measurements, the touch event is considered a touch hold action. If a release is detected before the threshold time, the touch event is considered a touch release action. The additional binary information (release or hold), which the user can convey in that way, will depend on the particular application.

Furthermore, beyond the chosen threshold time, the moment in time at which the hold becomes a release can be determined. As stated before, the interaction surface, in this case a touch panel 3, does transmit acoustic waves during a movement over the panel, so that a drag movement is detected without a problem, but the presence of an unmoving finger on the panel is difficult to detect by the acoustic technique when the hold action is too long, but the exact moment of release in relation to the displayed information on a display device below the touch panel can be just as important as the moment and place at which the touch starts.

Furthermore, it can also be detected, whether a second touch (e.g. by a second finger) should be interpreted as the start of a multiple-touch event, when the first finger remains on the touch panel, or a new individual touch event, in case the first touch has been terminated. Two- or more-finger actions can be used for special tasks.

According to another variant of touch sensing device 1, the processing means 19 is configured to not only indicate an hold or release action but depending on the magnitude of capacitance change can also provide an output being indicative to the level of the force exerted onto the panel, e.g. slightly touching or punching. Depending on the magnitude the hold action different actions could be instructed by the processing means 19 or 9.

According to a variant, the processing means 19 or 9 can be configured to compare the detection record of the acoustic waves with the record of the capacitance changes, to correlated the two records at the beginning of the touch action. This comparison can be executed in real time. Measured changes in the capacitance 17 can then be attributed to a certain touch event identified by the processing means 19 based on the acoustic signal.

The isolation means, thus the gasket 11, and the upper and lower electrodes 13 and 15 sandwiching the isolation means 11 can be provided with several variations according to the invention.

Here, the isolation means 11 preferably has two flat surfaces 23, 25 that are substantially parallel. The upper and lower electrodes 13 and 15 are arranged so that they are substantially perpendicular to the compression direction of the isolation means 11. Preferably both flat surfaces 23, 25 are parallel to the main surface of the touch panel 3. The surfaces connecting the two surfaces 23, 25 in contact with the electrodes 13, 15 can be at right angles with those two surfaces 23, 25, but may also have a different orientation. In order to optimize the variation in capacitance, the thickness of the isolation means 11 is balanced with its acoustic isolation properties. The acoustic isolation material of the gasket 11 is compressible in an elastic way, so that it returns to its initial state after the touch-induced force has been removed.

The conductive electrodes 13, 15 illustrated in FIG. 1 can be implemented in several ways according to the invention. Both electrodes 13', 15' may be formed by a conductive plate, as for example a metallic plate or pieces of copper tape, as shown in FIG. 2a. This configuration has the advantage that the electrodes are easily applied, one 13' between the isolation means 11 and the touch panel 3 (see FIG. 1), and the other one 15' on the opposite surface of the isolation means 11, parallel to the first one. The electrodes 13', 15' are connected to the respective input means of a capacitance converter means 19, like illustrated in FIG. 1.

One or both of the electrodes 13, 15 may be replaced by a wire, more in particular a copper wire or a steel wire. FIG. 2b represents a configuration, wherein the upper electrode 13" is formed by a steel wire and the lower electrode 15' by a metal plate. Actually, the electrodes 13, 15 can be implemented in any suitable way, as long as the pair of electrodes are conductive and form a capacitor the capacitance of which changes upon an impact on the touch panel.

A further inventive configuration is shown in FIG. 2c. In that configuration, the lower electrode 15" is formed by a metallic frame, for example the metallic frame of a display, e.g. a LCD device, on which the touch sensing device of the present invention, like illustrate in FIG. 1, is placed. The upper electrode 13" may be formed by a steel wire, or by any of the other possible electrode variations mentioned above. This configuration has the advantage, that no additional lower electrode 15 needs to be provided.

FIG. 3, illustrates a second embodiment of the present invention. In this embodiment three capacitors 17a, 17b and 17c are attached to the touch panel 3. Each one of the three capacitors 17a, 17b, and 17c is build up the same way as described above with respect to capacitor 17 of the first embodiment and is connected to the means for determining the capacitance 19. The capacitors 17a, 17b and 17c each also comprise an acoustic isolating means to decouple the touch panel 3 from the rest of the device. To optimize this functionality, the acoustic isolating means are arranged along the edges of the panel 3.

Of course depending on the geometry of the device only two or more acoustic isolating means can be arranged to ensure the acoustic isolation.

Apart from the functions described above for the first embodiment and its variant, the provision of more than one capacitor provides additional functionality. The touch sensing device 31 according to the second embodiment can provide three capacitance measurements.

The measured capacitance values of three capacitive sensors based on capacitors 17a, 17b and 17c can not only be used to determine whether there is a hold action but can also provide information about the position of the hold action, based on a comparison with each other. For instance, the change in capacitance will be larger at capacitor 17a compared to the change at capacitor 17b, when in impact occurs at position x. This location information is coarse compared to the resolution which can be provided by using the acoustic signals.

Nevertheless, based on this additional information a confidence value can be attributed to a detected hold action. Indeed, if the acoustic and capacitance touch locations are substantially the same, within a certain predetermined confidence limit, the touch hold action detected by the system of capacitance sensors can be attributed with more certainty to the touch detected using the acoustic signal, and spurious unwanted effects occurring away from the location of the intentional impact can be filtered out, at least partially.

In some touch location systems determining the location of an impact using acoustic signals use is made of reference signals previously stored in a database. The location of an impact can then be based on a comparison of the measured signals with the previously stored ones, e.g. using correlations etc. In such a case the coarse impact localisation based on the capacitance measurements of capacitors 17a, 17b and 17c can be advantageously used to restrict the area in which the impact occurred so that only the reference signals of that area are used in the impact location process. This would greatly reduce the necessary computational power and/or speed up the localisation determining process.

In the above described embodiments, the capacitance value was used once an impact had been determined by the processing unit 9 of the acoustic impact localisation system. Nevertheless according to a further variant, a preferably continuous analysing of the capacitance value can be used to wake up the acoustic impact localisation system upon the detection of a change in capacitance indicating an impact.

The inventions of the embodiment have the advantage that by providing capacitance measurements, hold actions of a touch detected using acoustic signals can be determined in a simple manner by providing electrodes sandwiching the acoustic isolating means which serves as compressible dielectric. In addition, the measured capacitance values can advantageously be used to wake up the touch detection system, to speed up the data analysing process using the coarse localisation capabilities in case a plurality of capacitors are formed.

The invention claimed is:

1. A touch sensing device with a touch hold function, comprising:
   an interaction surface, in particular a touch panel, with a touch location system for determining a touch position based on an acoustic signal,
   an acoustic isolating means being elastically compressive and dielectric provided on one surface of the interaction surface;
   a first conductive electrode provided between the interaction surface and the isolating means;
   a second conductive electrode, the first conductive electrode and the second conductive electrode sandwiching the isolating means;
   a means for determining the capacitance between the first conductive electrode and the second conductive electrode; and
   a capacitance processing means configured to
     determine a touch hold and/or touch release based on a change of capacitance between the first conductive electrode and the second conductive electrode,
     determine a hold action upon the detection of a touch by the touch location system,
     provide information regarding a hold position on the basis of a plurality of measured capacitances, and
     and carry out a comparison of the touch position determined by the touch location system and the hold position.

2. A touch sensing device according to claim 1, wherein the capacitance processing means is configured to determine the touch hold and/or touch release based on a change of capacitance being larger than a predetermined threshold.

3. A touch sensing device according to claim 2,
   wherein the isolating means comprises a plurality of isolating means, in particular placed along more than one edge of the touch panel,
   each of the plurality of isolating means being sandwiched between a first conductive electrode and a second conductive electrode, and
   a means for measuring the capacitance of each pair of first conductive electrode and second conductive electrode.

4. A touch sensing device according to claim 3, wherein the plurality of measured capacitances comprises measured capacitances of each pair of first and second conductive electrodes.

5. A touch sensing device according to claim 1, wherein the touch location system for determining a touch position comprises at least two transducers for acoustic waves.

6. A touch sensing device according to claim 1, wherein the first conductive electrode is a wire, in particular a steel wire, or a tape, in particular a copper plate.

7. A touch sensing device according to claim 1, wherein the second conductive electrode is a metallic plate, in particular a copper tape.

8. A touch sensing device according to claim 1, wherein the capacitance processing means is furthermore configured to carry out an auto-adaptation based on a change of a baseline of the measured capacitance.

9. A touch screen system with a hold and/or release function, comprising:
   a touch sensing device according to claim 1 and a screen with a metallic frame, wherein the metallic frame corresponds to the second electrode.

10. A method for determining a touch position and a touch hold and/or touch release action on a touch sensing device according to claim 1, comprising:
    determining a touch, in particular the location of the touch, based on an acoustic signal provided by an impact on the interaction surface;
    monitoring the capacitance between the first conductive electrode and the second conductive electrode, in particular after detecting the touch;
    deciding whether a touch-hold action or a touch-release action is detected on the basis of the monitored capacitance,
    wherein a touch release action is established when a change in capacitance is larger than a predetermined threshold value.

11. The method according to claim 10,
    wherein a touch hold action is established if a change in capacitance is within a predetermined range over a predetermined time duration after detecting the touch.

* * * * *